United States Patent [19]

Pellegrini et al.

[11] Patent Number: 4,473,677

[45] Date of Patent: Sep. 25, 1984

[54] POLYOLEFINIC FIBERS HAVING IMPROVED THERMAL BONDING PROPERTIES AND PROCESS FOR OBTAINING SAME

[75] Inventors: Antonio Pellegrini, Milan; Benito Beghelli, Monza, both of Italy

[73] Assignee: Merak S.p.A., Milan, Italy

[21] Appl. No.: 521,265

[22] Filed: Aug. 8, 1983

[30] Foreign Application Priority Data

Aug. 9, 1982 [IT] Italy .............................. 22783 A/82

[51] Int. Cl.$^3$ .............................................. C08K 5/09

[52] U.S. Cl. ................................... 524/109; 524/570; 524/583

[58] Field of Search ............................... 524/109, 285

[56] References Cited

U.S. PATENT DOCUMENTS

3,201,363  8/1965  Spurlin .............................. 524/109

*Primary Examiner*—Lewis T. Jacobs

[57] ABSTRACT

Polyolefinic fibers having improved thermal bonding properties, containing from 0.01 to 5% by weight of dianhydride of the 3, 3', 4, 4' benzophenone tetracarboxylic acid or of an alkyl derivative thereof.

6 Claims, No Drawings

POLYOLEFINIC FIBERS HAVING IMPROVED THERMAL BONDING PROPERTIES AND PROCESS FOR OBTAINING SAME

BACKGROUND OF THE INVENTION

1. Field of the Invention

The present invention relates to polyolefinic fibers having improved thermal bonding properties and to the relevant process for obtaining same.

More particularly the present invention relates to polyolefinic fibers having improved thermal bonding properties, specially suitable for producing fabrics cohesioned by thermal bonding and products intended to be used for thermo-forming processes.

The term polyolefinic fibers, as used in the present disclosure and in the claims, comprises as well the fibrous materials, generally known as fibrils, fibrids and plexo filamentary fibrids, even the ones having a surface area larger than 1 m$^2$/g.

2. The Prior Art

As known, polyolefinic fibers are widely employed for the manufacture of products cohesioned by thermal bonding, in particular by the calendering technology.

It is also known, how the process conditions for preparing the polyolefinic fibers, affect the thermal bonding properties of the obtained fibers.

In fact it is known that the thermal bonding properties of the polyolefinic fibers improve by lowering the draw ratio and attaining the highest value in the undrawn fibers.

The production of undrawn or of partially drawn fibers, of course, reduces the productivity of the spinning machine and, therefore, the less the draw ratio the more decisive is the influence on the cost of the product.

It has been proposed to employ, for the production of thermal bonded products, bicomponent polypropylene-polyethylene fibers of "side-by-side" type, so that the polyethylene, having a lower melting point, allows an easier bonding among the fibers. The use of these bicomponent fibers, however, did not succeed to obtain satisfactory cohesioning values, because the bond among the fibers only occurs between polyethylene and polyethylene.

It was also proposed to employ fibers consisting of ethylene-propylene copolymers. These fibers succeeded to obtain satisfactory thermal bonding, by working at less critical temperatures and process conditions, with respect to the ones used for the drawn polypropylenic fibers, but the cost of these fibers is higher than the one of the usual polypropylenic fibers.

THE PRESENT INVENTION

An object of the present invention is to improve the thermal bonding properties of the polyolefinic fibers, without resorting to process or polymer modifications and without sensibly increasing the production cost.

According to the present invention this and still other objects, are achieved by incorporating into the fibers the dianhydride of the 3, 3', 4, 4' benzophenone tetracarboxylic acid or of an alkyl derivative thereof, having general formula:

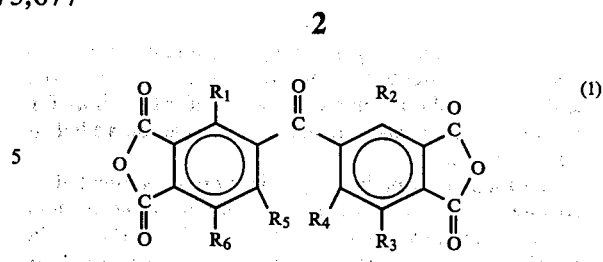

wherein each of $R_1$, $R_2$, $R_3$, $R_4$, $R_5$ and $R_6$, which may be the same or different, is hydrogen or an alkyl radical containing from 1 to 3 carbon atoms.

Therefore, the present invention, provides polyolefinic fibers, containing from 0.01 to 5% by weight of the dianhydride of 3, 3', 4, 4' benzophenone tetracarboxylic acid or of an alkyl derivative thereof having the above reported general formula (1).

The presence of the dianhydride having general formula (1) improves the thermal bonding properties of the polyolefinic fibers, without affecting the mechanic and textile characteristics of the fibers and without causing dangerous interactions with the optionally present dyes, pigments and/or stabilizing agents.

Among the dianhydrides having general formula (1), the dianhydride of the 3, 3', 4, 4' benzophenone tetracarboxylic acid is preferred.

The amount of dianhydride can vary within the above reported range, depending on the desired type of thermal bonded products and on the thermal bonding conditions.

Generally, amounts ranging between 0.05 and 0.5% by weight and preferably between 0.05 and 0.2% by weight, are preferred.

As polyolefin the polypropylene consisting prevalently of isotactic macromolecules and obtained by stereospecific polymerization of the propylene is preferably employed.

However, crystalline copolymers based on propylene, such as ethylene-propylene copolymers having a prevailing propylene content and the polyolefins deriving from monomers of formula R—CH=CH$_2$, in which R is an alkyl radical or a hydrogen atom, such as polyethylene, are equally suitable. In the ethylene-propylene copolymers the amount of ethylene, preferably, does not exceed 10% by weight. These polymers can be in the form of pellets, powder, flakes having controlled particle size distribution and can have a "melt flow index", determined according to the ASTM D 1238-L, ranging between 2 and 50.

The incorporation of the dianhydride having general formula (1) into the polyolefin is generally carried out before the extrusion or in a mixer or in the spinning extruder itself or at the end of the polyolefin polymerization. Should the incorporation be carried out in the extruder or in the mixer, the corresponding acid of the dianhydride having formula (1) can be fed.

The additive can be employed in the form of powder, or in solution in a suitable solvent or pre-dispersed in the olefinic polymer itself.

Any known device of melt-spinning can be used; preferably spinnerets with holes, having a length/diameter ratio higher than 1, are employed.

The spinning and optionally the preventive pellettising operation are preferably carried out in the absence of oxygen.

During the spinning process, in addition to the dianhydrides having the above reported general formula (1), also dulling agents, organic and inorganic coloring pigments and products for the neutralization of possible acid residues of the polymerization catalyst, such as, for instance, zinc or calcium stearate etc. can be added to the polyolefin.

The filaments obtained by extrusion are subjected to a drawing process, at draw ratio, ranging between 2 and 10, at temperatures ranging between 80° and 150° C., in drawing devices heated by means of hot air, steam or other fluid, or provided with a heating plate.

The drawn filaments can be subjected to a treatment of heat setting at free or prevented retraction at 80°–160° C.

The yarns obtained by the present invention, can be monofilament or multifilaments and can be employed for preparing staple or spun-bonded fabrics.

Besides for preparing fibers, the polyolefins additioned with the dianhydrides having general formula (1), can be used for preparing films, raffia, fibrils, provided by wet spinning, slivers and similar formed articles, by using the conventional extrusion or spinning techniques.

The fibers containing one of the dianhydrides having general formula (1), according to the present invention, can be used alone or in blend with a non-additioned polyolefinic fiber or in blend with other natural, artificial and/or synthetic fibers, for producing heat-cohesioned products, thermo-formed products and non-woven fabrics. Said products can be obtained either by calendering between hot rollers or by heat treatment in a oven at free or prevented retraction.

Because of the improved thermal bonding properties of the fibers of the present invention, manufactured products can be obtained, having, under the same conditions of weight and of heat treatment, higher tenacity, with respect to the ones obtained from the same non-additioned fiber; this allows to use a lower amount of fiber for surface unit.

Furthermore, by using the fiber of the present invention, it is possible to work at lower treatment temperatures, saving energy consumption and working under less critical conditions, and/or to reduce the residence times at high temperature, with increase of the plant productivity. In order to better understand the present invention and for the practical embodiment thereof, some illustrative examples are given, which are not intended to be limiting at all.

EXAMPLE 1

A 60 mm. Covema extruder was fed with 27 kg/h of polypropylene having melt index 12, residue, after extraction with heptane, 97.8% and ashes 160 p.p.m., additioned with 0.1% by weight of calcium stearate, 0.05% by weight of IRGANOX 1425, produced and sold by CIBA-GEIGY, as stabilizing agent, and the dianhydride of the 3, 3', 4, 4' benzophenone tetracarboxylic acid in the amount reported on Table I.

The blend was extruded at 260° C. through a spinneret having 575 holes, each having a diameter of 0.6 mm. The obtained fibers were collected at 800 m/min., by obtaining a title of 8.2 dtex. The fibers were subjected to drawing in steam atmosphere at 100° C., with a draw ratio of 3.8. After the draw, the fibers were crimped, heat set at 130° C. and cut to staple having a length of 60 mm. The staple had a count of 2.8 dtex.

The obtained staples were subjected to the calendering operation, used in the production of coverstock for hygienic sanitary products. For this purpose the staples were carded by woollen card with rigid card clothings for the processing of fine denier fibers and the coming out web, having a width of 1 m, with fibers normally oriented in the running direction of the machine, was divided in two parts, overlapped and fed to a calender.

The employed calender utilizes 4 rollers having the following arrangement, from the top downwards:

heated smooth steel roller (AC1)
elastic roller covered with paper/cotton (CC)
plastic roller covered with nylon (NY)
heated smooth steel roller (AC2)

The overlapped webs having a global weight of 18 g/m², entered span AC2/NY, bonding each other on the lower face, rolled upon rollers NY and CC, then they entered span AC1/CC, bonding each other on the upper face and were continuously collected.

The feeding speed of the card web was 40 m/min., and the temperature of the heated rollers was varied.

On Table I is reported the mechanical strength in direction normal to the machine direction, determined according to the ASTM D 1682 and expressed as breaking length in km. of the obtained coverstocks, versus the amount of the dianhydride of the 3, 3', 4, 4' benzophenone tetracarboxylic acid and versus the temperature of heated rollers AC1 and AC2.

TABLE I

| Amount of dianhydride of the 3, 3', 4, 4' benzophenone tetracarboxylic acid | Mechanical strength in km at: | | | | | | |
|---|---|---|---|---|---|---|---|
| | 170° C. | 175° C. | 180° C. | 185° C. | 190° C. | 195° C. | 200° C. |
| — | 0.15 | 0.21 | 0.31 | 0.39 | 0.48 | 0.60 | 0.67 |
| 0.01 | 0.25 | 0.30 | 0.38 | 0.52 | 0.60 | 0.70 | 0.80 |
| 0.05 | 0.28 | 0.35 | 0.44 | 0.61 | 0.72 | 0.81 | 0.89 |
| 0.075 | 0.29 | 0.36 | 0.47 | 0.64 | 0.85 | 1.20 | 1.25 |
| 0.1 | 0.34 | 0.55 | 0.82 | 0.90 | 0.97 | 1.25 | 1.32 |

EXAMPLE 2

By operating according to the working conditions of example 1, fibers were prepared, containing 0.075% by weight of dianhydride of 3, 3', 4, 4' benzophenone tetracarboxylic acid.

The fibers were turned into coverstocks by operating according to example 1, at different calendering speeds.

The values of mechanical strength of the coverstocks, expressed as breaking length, versus the speed and versus the temperature of rollers AC1 and AC2, determined according to example 1, are reported on the following Table II.

TABLE II

| Calendering speed in m/min. | Mechanical strength in km at: | | | |
|---|---|---|---|---|
| | 190° C. | 195° C. | 200° C. | 205° C. |
| 40 | 0.85 | 1.20 | 1.25 | 1.32 |
| 60 | 0.70 | 0.76 | 0.91 | 1.21 |
| 70 | 0.65 | 0.70 | 0.82 | 0.98 |

TABLE II-continued

| Calendering speed in m/min. | Mechanical strength in km at: | | | |
|---|---|---|---|---|
| | 190° C. | 195° C. | 200° C. | 205° C. |
| 80 | 0.25 | 0.37 | 0.47 | 0.75 |

For purposes of comparison, the same fibers not containing the dianhydride of the 3, 3', 4, 4' benzophenone tetracarboxylic acid, give the following values of mechanical strength:

TABLE III

| Calendering speed in m/min. | Mechanical strength in km at: | | | |
|---|---|---|---|---|
| | 190° C. | 195° C. | 200° C. | 205° C. |
| 40 | 0.48 | 0.60 | 0.67 | 0.61 |
| 60 | 0.22 | 0.30 | 0.42 | 0.48 |
| 70 (*) | — | — | — | — |
| 80 (*) | — | — | — | — |

(*) For calendering speed of 70 and 80 m/min., it is impossible to collect the coverstock owing to its insufficient tenacity.

EXAMPLE 3

19.6 kg. of a random copolymer ethylene-propylene containing 5% by weight of ethylene, having a melt flow index of 6.5, additioned with 0.1% by weight of calcium stearate, 0.05% by weight of IRGANOX 1425, produced and sold by Ciba-Geigy, as stabilizing agent, and 0.075% by weight of dianhydride of the 3, 3', 4, 4' benzophenone tetracarboxylic acid, were fed into a 60 mm. extruder type Covema. The blend was extruded at 280° C. through a spinneret having 666 holes, each having a diameter of 0.5 mm.

The obtained fibers (A) were collected at 600 m/min., obtaining a title of 8.2 dtex. The fibers were subjected to drawing in steam atmosphere at 100° C., with a draw ratio of 3.8. After the draw, the fibers were crimped, heat stabilized at 110° C. and cut in staples having a length of 50 mm. and a title of 2.8 dtex.

Fibers (B) were prepared as the above, but without the addition of dianhydride of the 3, 3', 4, 4' benzophenone tetracarboxylic acid.

The two fibers (A) and (B) were calendered and converted in coverstock for hygienic sanitary products by operating according to the working conditions of example 1, except lower calendering temperatures, as reported in Table IV.

The mechanical strength in direction normal to the machine direction, determined according to the ASTM D 1682 standard and expressed as breaking length in km. of the obtained coverstocks is reported on Table IV.

TABLE IV

| Calendering temperature | Mechanical strength in km | |
|---|---|---|
| | Fiber B | Fiber A |
| 165° C. | 0.16 | 0.65 |
| 170° C. | 0.18 | 0.67 |
| 175° C. | 0.27 | 0.74 |
| 180° C. | 0.43 | 0.85 |

What we claim is:

1. Polyolefinic fibers with improved thermal bonding properties containing from 0.01 to 5% by weight of dianhydride of the 3, 3', 4, 4' benzophenone tetracarboxylic acid or of an alkyl derivative thereof having general formula:

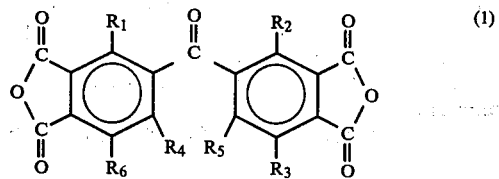

wherein each of $R_1$, $R_2$, $R_3$, $R_4$, $R_5$ and $R_6$, which may be the same or different, is hydrogen or an alkyl radical containing from 1 to 3 carbon atoms.

2. Polyolefinic fibers, according to claim 1, wherein the amount of the dianhydride or its alkyl derivative having general formula (1) ranges between 0.05 and 0.5% by weight.

3. Polyolefinic fibers according to claim 2, wherein the amount of the dianhydride or its alkyl derivative having general formula (1) ranges between 0.05 and 0.2% by weight.

4. Polyolefinic fibers according to claim 1, wherein the polyolefin is polypropylene, consisting essentially of isotactic macromolecules and obtained by stereospecific polymerization of the propylene.

5. Polyolefinic fibers, according to claim 1, wherein the polyolefin is an ethylene-propylene copolymer having a content of ethylene not exceeding 10% by weight.

6. A process for producing the polyolefinic fibers of claim 1, characterized in that it consists in incorporating the dianhydride or an alkyl derivative thereof, having the above reported general formula (1) into the polyolefin, before the extrusion in a mixer, in the spinning extruder or at the end of the olefin polymerization.

* * * * *